(12) United States Patent
Millet

(10) Patent No.: US 7,890,663 B2
(45) Date of Patent: Feb. 15, 2011

(54) IDENTIFYING NODES IN A RING NETWORK

(75) Inventor: Tim Millet, Mountain View, CA (US)

(73) Assignee: Fortinet, Inc., Sunnyvale, CA (US)

( * ) Notice: Subject to any disclaimer, the term of this patent is extended or adjusted under 35 U.S.C. 154(b) by 1233 days.

(21) Appl. No.: 11/460,977

(22) Filed: Jul. 29, 2006

(65) Prior Publication Data

US 2006/0265519 A1   Nov. 23, 2006

Related U.S. Application Data

(62) Division of application No. 09/894,471, filed on Jun. 28, 2001, now Pat. No. 7,181,547.

(51) Int. Cl.
  *G06F 15/16* (2006.01)
  *G06F 11/00* (2006.01)
  *H04L 13/00* (2006.01)
  *H04L 12/28* (2006.01)
  *H04L 12/403* (2006.01)

(52) U.S. Cl. .............. 709/251; 370/222; 370/254; 370/258; 370/455; 710/107; 710/111

(58) Field of Classification Search .............. 709/251; 370/222, 254, 258, 455; 710/107, 111
See application file for complete search history.

(56) References Cited

U.S. PATENT DOCUMENTS

| | | | |
|---|---|---|---|
| 4,590,468 A | 5/1986 | Stieglitz | |
| 4,667,287 A | 5/1987 | Allen et al. | |
| 4,667,323 A * | 5/1987 | Engdahl et al. | ............. 370/451 |
| 4,726,018 A * | 2/1988 | Bux et al. | ............. 370/455 |
| 5,371,852 A | 12/1994 | Attanasion et al. | |

(Continued)

FOREIGN PATENT DOCUMENTS

WO   0051290   8/2000

(Continued)

OTHER PUBLICATIONS

Notice of Allowance dated Dec. 1, 2004 for U.S. Appl. No. 09/661,636.

(Continued)

*Primary Examiner*—Philip C Lee
(74) *Attorney, Agent, or Firm*—Hamilton, DeSanctis & Cha LLP

(57) ABSTRACT

Methods are provided for determining a master node on a ring network. According to one embodiment, a first node on the ring network initiates circulation of an arbitration token by (i) determining an arbitration token timeout period has elapsed and (ii) transmitting the arbitration token to a neighboring node. Upon receipt of the arbitration token by a node, it determines its relative priority by comparing its ID to an ID field of the arbitration token, initialized by the first node. If the node is determined to be higher priority, then it overwrites the ID field and retransmits the arbitration token onto the ring network. If the node is determined to be lower priority, then the node retransmits the arbitration token without overwriting the ID field. If the node is determined to be of equal priority and the node is the first node, then it assumes the master node role.

11 Claims, 6 Drawing Sheets

U.S. PATENT DOCUMENTS

| | | | |
|---|---|---|---|
| 5,473,599 | A | 12/1995 | Li et al. |
| 5,490,252 | A | 2/1996 | Macera et al. |
| 5,568,525 | A | 10/1996 | de Nijs et al. |
| 5,581,705 | A | 12/1996 | Passint et al. |
| 5,598,414 | A * | 1/1997 | Walser et al. ............... 370/455 |
| 5,633,866 | A | 5/1997 | Callon |
| 5,745,778 | A | 4/1998 | Alfieri |
| 5,825,772 | A | 10/1998 | Dobbins et al. |
| 5,841,973 | A | 11/1998 | Kessler et al. |
| 5,875,290 | A | 2/1999 | Bartfai et al. |
| 5,892,924 | A | 4/1999 | Lyon et al. |
| 5,920,705 | A | 7/1999 | Lyon et al. |
| 5,963,555 | A | 10/1999 | Takase et al. |
| 5,964,847 | A | 10/1999 | Booth et al. |
| 5,987,521 | A | 11/1999 | Arrowood et al. |
| 6,014,382 | A | 1/2000 | Takihiro et al. |
| 6,014,669 | A | 1/2000 | Slaughter et al. |
| 6,032,193 | A | 2/2000 | Sullivan |
| 6,047,330 | A | 4/2000 | Stracke |
| 6,069,895 | A | 5/2000 | Ayandeh |
| 6,085,238 | A | 7/2000 | Yuasa et al. |
| 6,098,110 | A | 8/2000 | Witkowski et al. |
| 6,108,699 | A | 8/2000 | Moiin |
| 6,118,791 | A | 9/2000 | Fichou et al. |
| 6,137,777 | A | 10/2000 | Vaid et al. |
| 6,169,739 | B1 | 1/2001 | Isoyama |
| 6,169,793 | B1 | 1/2001 | Godwin et al. |
| 6,175,867 | B1 | 1/2001 | Taghadoss |
| 6,192,051 | B1 | 2/2001 | Lipman et al. |
| 6,220,768 | B1 | 4/2001 | Barroux |
| 6,226,788 | B1 | 5/2001 | Schoening et al. |
| 6,243,580 | B1 | 6/2001 | Garner |
| 6,246,682 | B1 | 6/2001 | Roy et al. |
| 6,249,519 | B1 | 6/2001 | Rangachar |
| 6,256,295 | B1 | 7/2001 | Callon |
| 6,260,072 | B1 | 7/2001 | Rodriguez |
| 6,260,073 | B1 | 7/2001 | Walker et al. |
| 6,266,695 | B1 | 7/2001 | Huang et al. |
| 6,269,099 | B1 | 7/2001 | Borella et al. |
| 6,278,708 | B1 | 8/2001 | Von Hammerstein et al. |
| 6,286,038 | B1 | 9/2001 | Reichmeyer et al. |
| 6,295,297 | B1 | 9/2001 | Lee |
| 6,298,130 | B1 | 10/2001 | Galvin |
| 6,304,557 | B1 | 10/2001 | Nakazumi |
| 6,330,602 | B1 | 12/2001 | Law et al. |
| 6,338,092 | B1 | 1/2002 | Chao et al. |
| 6,343,083 | B1 | 1/2002 | Mendelson et al. |
| 6,405,262 | B1 | 6/2002 | Vogel et al. |
| 6,414,595 | B1 | 7/2002 | Scrandis et al. |
| 6,434,619 | B1 | 8/2002 | Lim et al. |
| 6,438,612 | B1 | 8/2002 | Ylonen et al. |
| 6,449,650 | B1 | 9/2002 | Westfall et al. |
| 6,453,406 | B1 | 9/2002 | Sarnikowski et al. |
| 6,463,061 | B1 | 10/2002 | Rekhter et al. |
| 6,466,976 | B1 | 10/2002 | Alles et al. |
| 6,493,349 | B1 | 12/2002 | Casey |
| 6,496,935 | B1 | 12/2002 | Fink et al. |
| 6,526,056 | B1 | 2/2003 | Rekhter et al. |
| 6,532,088 | B1 | 3/2003 | Dantu |
| 6,542,466 | B1 | 4/2003 | Pashtan et al. |
| 6,542,502 | B1 | 4/2003 | Herring et al. |
| 6,542,515 | B1 | 4/2003 | Kumar et al. |
| 6,556,544 | B1 | 4/2003 | Lee |
| 6,597,956 | B1 | 7/2003 | Aziz et al. |
| 6,608,816 | B1 | 8/2003 | Nichols |
| 6,609,153 | B1 | 8/2003 | Salkewicz |
| 6,611,498 | B1 | 8/2003 | Baker et al. |
| 6,611,522 | B1 | 8/2003 | Zheng et al. |
| 6,633,571 | B1 | 10/2003 | Sakamoto et al. |
| 6,636,516 | B1 | 10/2003 | Yamano |
| 6,639,897 | B1 | 10/2003 | Shiomoto et al. |
| 6,640,248 | B1 | 10/2003 | Jorgensen |
| 6,654,787 | B1 | 11/2003 | Aronson et al. |
| 6,658,013 | B1 | 12/2003 | de Boer et al. |
| 6,668,282 | B1 | 12/2003 | Booth et al. |
| 6,680,922 | B1 | 1/2004 | Jorgensen |
| 6,694,437 | B1 | 2/2004 | Pao et al. |
| 6,697,359 | B1 | 2/2004 | George |
| 6,697,360 | B1 | 2/2004 | Gai et al. |
| 6,732,314 | B1 | 5/2004 | Borella et al. |
| 6,738,371 | B1 | 5/2004 | Ayres |
| 6,763,236 | B2 | 7/2004 | Siren |
| 6,769,124 | B1 | 7/2004 | Schoening et al. |
| 6,775,267 | B1 | 8/2004 | Kung |
| 6,775,284 | B1 | 8/2004 | Calvignac et al. |
| 6,785,224 | B2 | 8/2004 | Uematsu et al. |
| 6,807,181 | B1 | 10/2004 | Weschler |
| 6,816,462 | B1 | 11/2004 | Booth et al. |
| 6,820,210 | B1 | 11/2004 | Daruwalla et al. |
| 6,822,958 | B1 | 11/2004 | Branth et al. |
| 6,868,082 | B1 | 3/2005 | Allen et al. |
| 6,883,170 | B1 | 4/2005 | Garcia |
| 6,920,146 | B1 | 7/2005 | Johnson et al. |
| 6,922,774 | B2 | 7/2005 | Meushaw et al. |
| 6,938,097 | B1 | 8/2005 | Vincent |
| 6,944,128 | B2 | 9/2005 | Nichols |
| 6,944,168 | B2 | 9/2005 | Paatela et al. |
| 6,954,429 | B2 | 10/2005 | Horton et al. |
| 6,982,984 | B1 | 1/2006 | Asayesh |
| 6,985,438 | B1 | 1/2006 | Tschudin |
| 6,985,956 | B2 | 1/2006 | Luke et al. |
| 7,020,143 | B2 | 3/2006 | Zdan |
| 7,028,333 | B2 | 4/2006 | Tuomenoksa et al. |
| 7,042,843 | B2 | 5/2006 | Ni |
| 7,042,848 | B2 | 5/2006 | Santiago et al. |
| 7,054,311 | B2 | 5/2006 | Norman et al. |
| 7,058,716 | B1 | 6/2006 | Sundaresan et al. |
| 7,062,642 | B1 | 6/2006 | Langrind et al. |
| 7,082,477 | B1 | 7/2006 | Sadhasivam et al. |
| 7,089,293 | B2 | 8/2006 | Grosner et al. |
| 7,096,383 | B2 | 8/2006 | Talaugon |
| 7,096,495 | B1 | 8/2006 | Warrier et al. |
| 7,111,072 | B1 | 9/2006 | Matthews |
| 7,116,665 | B2 | 10/2006 | Balay |
| 7,116,679 | B1 | 10/2006 | Ghahremani |
| 7,159,031 | B1 | 1/2007 | Larkin et al. |
| 7,161,904 | B2 | 1/2007 | Hussain et al. |
| 7,174,372 | B1 | 2/2007 | Sarkar |
| 7,177,311 | B1 | 2/2007 | Hussain |
| 7,181,547 | B1 | 2/2007 | Millet |
| 7,181,766 | B2 | 2/2007 | Bendinelli et al. |
| 7,187,676 | B2 | 3/2007 | DiMambro |
| 7,203,192 | B2 | 4/2007 | Desai |
| 7,225,259 | B2 | 5/2007 | Ho et al. |
| 7,263,106 | B2 | 8/2007 | Matthews |
| 7,266,120 | B2 | 9/2007 | Cheng |
| 7,272,643 | B1 | 9/2007 | Sarkar |
| 7,278,055 | B2 | 10/2007 | Talaugon |
| 7,313,614 | B2 | 12/2007 | Considine et al. |
| 7,337,221 | B2 | 2/2008 | Radi et al. |
| 7,340,535 | B1 | 3/2008 | Alam |
| 7,376,125 | B1 | 5/2008 | Hussain |
| 7,376,827 | B1 | 5/2008 | Jiao |
| 7,386,010 | B2 | 6/2008 | Solomon et al. |
| 7,389,358 | B1 | 6/2008 | Matthews |
| 7,463,633 | B2 | 12/2008 | Endo et al. |
| 7,499,398 | B2 | 3/2009 | Damon et al. |
| 2001/0024425 | A1 | 9/2001 | Tsunoda et al. |
| 2001/0033580 | A1 | 10/2001 | Dorsey et al. |
| 2001/0043571 | A1 | 11/2001 | Jang et al. |
| 2001/0048661 | A1 | 12/2001 | Clear et al. |
| 2001/0052013 | A1 | 12/2001 | Munguia et al. |
| 2002/0062344 | A1 | 5/2002 | Ylonen et al. |
| 2002/0066034 | A1 | 5/2002 | Schlossberg et al. |

| | | |
|---|---|---|
| 2002/0071389 A1 | 6/2002 | Seo |
| 2002/0075901 A1 | 6/2002 | Perlmutter et al. |
| 2002/0097672 A1 | 7/2002 | Barbas et al. |
| 2002/0099849 A1 | 7/2002 | Alfieri et al. |
| 2002/0150093 A1 | 10/2002 | Ott et al. |
| 2002/0152373 A1 | 10/2002 | Sun et al. |
| 2002/0162025 A1 | 10/2002 | Sutton et al. |
| 2002/0186661 A1 | 12/2002 | Santiago et al. |
| 2002/0186667 A1 | 12/2002 | Mor et al. |
| 2002/0191604 A1 | 12/2002 | Mitchell et al. |
| 2003/0012209 A1 | 1/2003 | Abdelilah et al. |
| 2003/0033401 A1 | 2/2003 | Poisson et al. |
| 2003/0055920 A1 | 3/2003 | Kakadia et al. |
| 2003/0063590 A1 | 4/2003 | Mohan et al. |
| 2003/0108041 A1 | 6/2003 | Aysan |
| 2003/0112799 A1 | 6/2003 | Chandra et al. |
| 2003/0115308 A1 | 6/2003 | Best et al. |
| 2003/0117954 A1 | 6/2003 | De Neve et al. |
| 2003/0131228 A1 | 7/2003 | Tworney |
| 2003/0169747 A1 | 9/2003 | Wang |
| 2003/0174650 A1 | 9/2003 | Shankar et al. |
| 2003/0185221 A1 | 10/2003 | Deikman et al. |
| 2003/0200295 A1 | 10/2003 | Roberts et al. |
| 2003/0212735 A1 | 11/2003 | Hickok et al. |
| 2003/0223406 A1 | 12/2003 | Balay |
| 2003/0223418 A1 | 12/2003 | Desai et al. |
| 2004/0006601 A1 | 1/2004 | Bernstein et al. |
| 2004/0019651 A1 | 1/2004 | Andaker |
| 2004/0037279 A1 | 2/2004 | Zelig et al. |
| 2004/0042416 A1 | 3/2004 | Ngo et al. |
| 2004/0054886 A1 | 3/2004 | Dickinson et al. |
| 2004/0078772 A1 | 4/2004 | Balay |
| 2004/0095934 A1 | 5/2004 | Cheng et al. |
| 2004/0141521 A1 | 7/2004 | George |
| 2004/0160900 A1 | 8/2004 | Lund et al. |
| 2004/0193922 A1 | 9/2004 | Bandini et al. |
| 2004/0199567 A1 | 10/2004 | Lund |
| 2004/0199568 A1 | 10/2004 | Lund |
| 2004/0199569 A1 | 10/2004 | Kalkunte et al. |
| 2005/0002417 A1 | 1/2005 | Kelly et al. |
| 2005/0047407 A1 | 3/2005 | Desai |
| 2005/0081059 A1 | 4/2005 | Bandini et al. |
| 2005/0108340 A1 | 5/2005 | Gleeson et al. |
| 2005/0163115 A1 | 7/2005 | Dontu et al. |
| 2006/0087969 A1 | 4/2006 | Santiago et al. |
| 2006/0206713 A1 | 9/2006 | Hickman et al. |
| 2007/0058648 A1 | 3/2007 | Millet |
| 2007/0064704 A1 | 3/2007 | Balay |
| 2007/0073733 A1 | 3/2007 | Matthews |
| 2007/0083528 A1 | 4/2007 | Matthews |
| 2007/0104119 A1 | 5/2007 | Sarkar |
| 2007/0109968 A1 | 5/2007 | Hussain |
| 2007/0110062 A1 | 5/2007 | Balay |
| 2007/0121579 A1 | 5/2007 | Matthews |
| 2007/0127382 A1 | 6/2007 | Hussain |
| 2007/0147368 A1 | 6/2007 | Desai |
| 2007/0237172 A1 | 10/2007 | Zelig et al. |
| 2007/0291755 A1 | 12/2007 | Chang |
| 2008/0013470 A1 | 1/2008 | Kopplin |
| 2008/0016389 A1 | 1/2008 | Talaugon |
| 2008/0117917 A1 | 5/2008 | Balay |
| 2008/0259936 A1 | 10/2008 | Hussain et al. |
| 2008/0317040 A1 | 12/2008 | Balay |
| 2008/0317231 A1 | 12/2008 | Balay et al. |
| 2008/0320553 A1 | 12/2008 | Balay |
| 2009/0007228 A1 | 1/2009 | Balay |
| 2009/0046728 A1 | 2/2009 | Matthews |
| 2009/0073977 A1 | 3/2009 | Hussain |
| 2009/0131020 A1 | 5/2009 | van de Groenendaal |
| 2009/0225759 A1 | 9/2009 | Hussain et al. |
| 2009/0238181 A1 | 9/2009 | Desai et al. |
| 2009/0279567 A1 | 11/2009 | Ta et al. |

FOREIGN PATENT DOCUMENTS

| | | |
|---|---|---|
| WO | 0076152 | 12/2000 |
| WO | 0163809 | 8/2001 |
| WO | 0223855 | 3/2002 |
| WO | 0310323 | 12/2003 |

OTHER PUBLICATIONS

Amendment and Response filed on Sep. 2, 2004 for U.S. Appl. No. 09/661,636.
Office Action dated May 28, 2004 for U.S. Appl. No. 09/661,636.
Amendment and Response filed on Mar. 22, 2004 for U.S. Appl. No. 09/661,636.
Office Action dated Nov. 18, 2003 U.S. Appl. No. 09/661,636.
Amendment and Response filed on Apr. 29, 2007 for U.S. Appl. No. 09/661,130.
Office Action dated Dec. 28, 2006 for U.S. Appl. No. 09/661,130.
Amendment and Response filed on Mar. 6, 2006 for U.S. Appl. No. 09/661,130.
Office Action dated Oct. 18, 2004 for U.S. Appl. No. 09/661,130.
Amendment and Response filed on Apr. 9, 2004 for U.S. Appl. No. 09/661,130.
Office Action dated Nov. 5, 2003 for U.S. Appl. No. 09/661,130.
Notice of Allowance dated Jun. 14, 2007 for U.S. Appl. No. 10/067,106.
Amendment and Response filed on Mar. 10, 2007 for U.S. Appl. No. 10/067,106.
Office Action dated Nov. 16, 2006 for U.S. Appl. Serial No. 10/067,106.
Amendment and Response filed on Aug. 28, 2006 for U.S. Appl. No. 10/067,106.
Office Action dated Mar. 27, 2006 for U.S. Appl. No. 10/067,106.
Amendment and Response filed on Nov. 6, 2006 for U.S. Appl. No. 09/663,483.
Office Action dated Jul. 6, 2006 for U.S. Appl. No. 09/663,483.
Amendment and Response filed on Mar. 13, 2006 for U.S. Appl. No. 09/663,483.
Advisory Action dated Nov. 12, 2004 for U.S. Appl. No. 09/663,483.
Amendment and Response filed on Oct. 8, 2004 for U.S. Appl. No. 09/663,483.
Office Action dated Jun. 3, 2004 for U.S. Appl. No. 09/663,483.
Amendment and Response filed on Feb. 26, 2004 for U.S. Appl. No. 09/663,483.
Office Action dated Aug. 21, 2003 for U.S. Appl. No. 09/663,483.
Amendment and Response filed on Mar. 13, 2006 for U.S. Appl. No. 09/952,520.
Office Action dated Mar. 14, 2005 for U.S. Appl. No. 09/952,520.
Notice of Allowance dated Jul. 30, 2007 for U.S. Appl. No. 09/663,485.
Amendment and Response filed on Jun. 11, 2007 for U.S. Appl. No. 09/663,485.
Office Action dated Jan. 11, 2007 for U.S. Appl. No. 09/663,485.
Amendment and Response filed on Aug. 28, 2006 for U.S. Appl. No. 09/663,485.
Office Action dated Jul. 26, 2007 for U.S. Appl. No. 09/663,485.
Amendment and Response filed on Feb. 2, 2006 for U.S. Appl. No. 09/663,485.
Office Action dated Dec. 21, 2004 for U.S. Appl. No. 09/663,485.
Amendment and Response filed on Nov. 16, 2004 for U.S. Appl. No. 09/663,485.
Office Action dated May 14, 2004 for U.S. Appl. No. 09/663,485.
Amendment and Response filed on Mar. 15, 2004 for U.S. Appl. No. 09/663,485.
Office Action dated Sep. 8, 2003 for U.S. Appl. No. 09/663,485.
Office Action dated Aug. 8, 2007 for U.S. Appl. No. 09/663,457.
Amendment and Response filed on Jul. 11, 2007 for U.S. Appl. No. 09/663,457.
Office Action dated May 17, 2007 for U.S. Appl. No. 09/663,457.
Amendment and Response filed on Oct. 2, 2006 for U.S. Appl. No. 09/663,457.
Office Action dated Apr. 22, 2005 for U.S. Appl. No. 09/663,457.

Office Action dated Aug. 27, 2004 for U.S. Appl. No. 09/663,457.
Amendment and Response filed on Jun. 21, 2004 for U.S. Appl. No. 09/663,457.
Office Action dated Dec. 11, 2003 for U.S. Appl. No. 09/663,457.
Notice of Allowance dated Nov. 21, 2006 for U.S. Appl. No. 09/663,484.
Amendment and Response filed on Aug. 24, 2006 for U.S. Appl. No. 09/663,484.
Office Action dated Feb. 24, 2006 for U.S. Appl. No. 09/663,484.
Amendment and Response filed on Feb. 7, 2006 for U.S. Appl. No. 09/663,484.
Office Action dated Apr. 6, 2005 for U.S. Appl. No. 09/663,484.
Office Action dated Aug. 1, 2007 for U.S. Appl. No. 10/163,260.
Amendment and Response filed on May 23, 2007 for U.S. Appl. No. 10/163,260.
Office Action dated Apr. 13, 2007 for U.S. Appl. No. 10/163,260.
Amendment and Response filed on Mar. 13, 2007 for U.S. Appl. No. 10/163,260.
Office Action dated Dec. 21, 2006 for U.S. Appl. No. 10/163,260.
Amendment and Response filed on Sep. 18, 2006 for U.S. Appl. No. 10/163,260.
Office Action dated May 18, 2006 for U.S. Appl. No. 10/163,260.
Office Action dated Aug. 22, 2007 for U.S. Appl. No. 10/650,298.
Response to Restriction Requirement Apr. 26, 2004 for U.S. Appl. No. 09/663,483 (000600).
Restriction Requirement dated Mar. 22, 2004 for U.S. Appl. No. 09/663,483 (000600).
Office Action dated Sep. 11, 2007 for U.S. Appl. No. 09/661,637 (000100).
Amendment and Response filed on Jun. 20, 2007 for U.S. Appl. No. 09/661,637 (000100).
Office Action dated Feb. 8, 2007 for U.S. Appl. No. 09/661,637 (000100).
Amendment and Response filed on Mar. 6, 2006 for U.S. Appl. No. 09/661,637 (000100).
Office Action dated Dec. 23, 2004 for U.S. Appl. No. 09/661,637(000100).
Amendment and Response filed on Aug. 5, 2004 for U.S. Appl. No. 09/661,637 (000100).
Office Action dated May 5, 2004 for U.S. Appl. No. 09/661,637 (000100).
Supplemental Amendment and Response filed on Sep. 17, 2007, for U.S. Appl. No. 09/663,457 (001000).
Amendment and Response filed on Nov. 12, 2004 for U.S. Appl. No. 09/663,484.
Office Action dated May 6, 2004 for U.S. Appl. No. 09/663,484.
Amendment and Response filed on Feb. 18, 2004 for U.S. Appl. No. 09/663,484.
Office Action dated Aug. 12, 2003 for U.S. Appl. No. 09/663,484.
Notice of Allowance dated Jan. 4, 2007 for U.S. Appl. No. 09/894,471.
Amendment and Response filed on Nov. 2, 2006 for U.S. Appl. No. 09/894,471.
Office Action dated Oct. 26, 2006 for U.S. Appl. No. 09/894,471.
Amendment and Response filed on Mar. 10, 2006 for U.S. Appl. No. 09/894,471.
Office Action dated Dec. 14, 2004 for U.S. Appl. No. 09/894,471.
Notice of Allowance dated Nov. 7, 2006 for U.S. Appl. No. 09/771,346.
Amendment and Response filed on Oct. 18, 2006 for U.S. Appl. No. 09/771,346.
Office Action dated Jul. 18, 2006 for U.S. Appl. No. 09/771,346.
Amendment and Response filed on Mar. 13, 2006 for U.S. Appl. No. 09/771,346.
Office Action dated Jan. 25, 2005 for U.S. Appl. No. 09/771,346.
Amendment and Response filed on Oct. 14, 2004 for U.S. Appl. No. 09/771,346.
Office Action dated Mar. 26, 2004 for U.S. Appl. No. 09/771,346.
Notice of Allowance dated Nov. 19, 2006 for U.S. Appl. No. 10/163,162.
Amendment and Response filed on Aug. 5, 2006 for U.S. Appl. No. 10/163,162.
Office Action dated May 5, 2006 for U.S. Appl. No. 10/163,162.
Notice of Allowance dated Jan. 4, 2007 for U.S. Appl. No. 10/163,261.
Amendment and Response filed on Nov. 9, 2006 for U.S. Appl. No. 10/163,261.
Office Action dated Nov. 3, 2006 for U.S. Appl. No. 10/163,261.
Amendment and Response filed on Aug. 22, 2006 for U.S. Appl. No. 10/163,261.
Office Action dated May 22, 2006 for U.S. Appl. No. 10/163,261.
Notice of Allowance dated Jul. 27, 2006 for U.S. Appl. No. 10/163,073.
Office Action dated May 30, 2007 for U.S. Appl. No. 10/273,669.
Amendment and Response filed on Mar. 9, 2007 for U.S. Appl. No. 10/273,669.
Office Action dated Sep. 21, 2006 for U.S. Appl. No. 10/273,669.
Amendment and Response filed on Jun. 21, 2006 for U.S. Appl. No. 10/273,669.
Office Action dated Feb. 21, 2006 for U.S. Appl. No. 10/273,669.
Notice of Allowance dated Aug. 14, 2007 for U.S. Appl. No. 10/163,071.
Amendment and Response filed on Jul. 17, 2007 for U.S. Appl. No. 10/163,071.
Office Action dated Jul. 3, 2007 for U.S. Appl. No. 10/163,071.
Amendment and Response filed on May 6, 2007 for U.S. Appl. No. 10/163,071.
Office Action dated Nov. 7, 2006 for U.S. Appl. No. 10/163,071.
Amendment and Response filed on Sep. 1, 2006 for U.S. Appl. No. 10/163,071.
Office Action dated Jun. 1, 2006 for U.S. Appl. No. 10/163,071.
Amendment and Response filed on Mar. 6, 2006 for U.S. Appl. No. 10/163,071.
Office Action dated Dec. 2, 2005 for U.S. Appl. No. 10/163,071.
Notice of Allowance dated Nov. 29, 2006 for U.S. Appl. No. 10/163,079.
Amendment and Response filed on Nov. 1, 2006 for U.S. Appl. No. 10/163,079.
Office Action dated Oct. 27, 2006 for U.S. Appl. No. 10/163,079.
Amendment and Response filed on Aug. 17, 2006 for U.S. Appl. No. 10/163,079.
Office Action dated May 17, 2006 for U.S. Appl. No. 10/163,079.
Notice of Allowance dated Jul. 17, 2007 for U.S. Appl. No. 10/298,815.
Amendment and Response filed on Mar. 9, 2007 for U.S. Appl. No. 10/298,815.
Office Action dated Feb. 23, 2007 for U.S. Appl. No. 10/298,815.
Notice of Allowance dated Jun. 27, 2005 for U.S. Appl. No. 10/232,979.
Notice of Allowance dated Jul. 5, 2007 for U.S. Appl. No. 11/466,098.
Amendment and Response filed on Aug. 10, 2007 for U.S. Appl. No. 10/163,260.
Chan, Mun C. et al., "An architecture for broadband virtual networks under customer control." IEEE Network Operations and Management Symposium. Apr. 1996. pp. 135-144.
Chan, Mun C. et al "Customer Management and Control of Broadband VPN Services." Proc. Fifth IFIP/IEEE International Symposium of Integrated Network Management. May 1997. pp. 301-314.
Gasparro, D.M., "Next-Gen VPNs: The Design Challenge." Data Communications. Sep. 1999. pp. 83-95.
Hanaki, M. et al., "Laniwan management integration using ATM CNM interface." IEEE Network Operations Management Symposium, vol. 1. Apr. 1996. pp. 12-21.
Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.
Keshav, S., "An Engineering Approach to Computer Networking: ATM networks, the internet, and the telephone network." Reading Mass: Addison-Wesley, Addison-Wesley Professional Computing Series. 1992. pp. 318-324.
Kim, E.C. et al., "The Multi-Layer VPN Management Architecture." Proc. Sixth IFIP/IEEE International Symposium on Integrated Network Management. May 1999. pp. 187-200.

Rao, J.R., Intranets and VPNs: Strategic Approach. 1988 Annual Review of Communications. 1998. pp. 669-674.
Tanenbaum, A.S., "Computer Networks." Upper Saddle River, N.J.: Prentice Hall PTR, 3rd Edition. 1996. pp. 348-364.
European Search Report for PCT/US03/37009 (Jul. 4, 2004) 2 pgs.
International Search Report for PCTUS03/17674. 6 pgs.
Lawrence, J. Lang et al. "Connecting Remote FDDI Installations with Single-Mode Fiber, Dedicated Lines, or SMDS." Jul. 1990; ACM SIGCOMM Computer Communication Review. vol. 20, Issue 3; pp. 72-82.
IEEE Potentials Publication; "Local Area Networks" Dec. 1995/Jan. 1996; pp. 6. http://www.ece.uc.edu/-paw/potentials/sample.
Office Action dated Nov. 28, 2007 for U.S. Appl. No. 09/952,520.
Office Action dated Oct. 18, 2007 for U.S. Appl. No. 09/663,483.
Office Action dated Oct. 16, 2007 for U.S. Appl. No. 09/661,130.
Non-Final Office Action for U.S. Appl. No. 09/952,520, dated May 30, 2008.
Advisory Action for U.S. Appl. No. 09/663,483, dated Apr. 11, 2008.
Fowler, D., "VPNs Become a Virtual Reality." Netnews, Apr./May 1998. pp. 1-4.
Non-Final Office Action for U.S. Appl. No. 11/556,697, dated Jul. 9, 2008.
Restriction Requirement for U.S. Appl. No. 10/991,970, dated Jul. 15, 2008.
Non-Final Office Action for U.S. Appl. No. 09/663,457, dated Jul. 15, 2008.
Final Office Action for U.S. Appl. No. 10/650,298, mailing date Sep. 3, 2008.
Final Office Action for U.S. Appl. No. 10/991,969, mailing date Sep. 22, 2008.
Non-Final Office Office for U.S. Appl. No. 11/671,462, mailed Oct. 8, 2008.
Restriction Requirement for U.S. Appl. No. 10/949,943, mailed Oct. 20, 2008.
Tsiang et al. "RFC 2892, The Cisco SRP MAC Layer Protocol." Aug. 2000, pp. 1-52.
Zhang et al. "Token Ring Arbitration Circuits for Dynamic Priority Algorithms" IEEE, 1995, pp. 74-77.
Non-Final Office Action for U.S. Appl. No. 11/537,609.
Non-Final Office Action for U.S. Appl. No. 11/621,102 mailed Mar. 30, 2009.
Non-Final Office Action for U.S. Appl. No. 11/616,243 mailed Mar. 3, 2009.
Final Office Action for U.S. Appl. No. 09/952,520 mailed Feb. 11, 2009.
Final Office Action for U.S. Appl. No. 09/663,457, mailed Feb. 3, 2009.
Non-Final Office Action for U.S. Appl. No. 11/530,901 mailed Jan. 26, 2009.
Non-Final Office Action for U.S. Appl. No. 10/991,969 mailed Apr. 27, 2009.
Non-Final Office Action for U.S. Appl. No. 11/684,614 mailed Apr. 24, 2009.
Non-Final Office Action for U.S. Appl. No. 11/849,352 mailed Jul. 17, 2009.
Non-Final Office Action for U.S. Appl. No. 10/991,970 mailed May 18, 2009.
Final Rejection for U.S. Appl. No. 11/530,901 mailed Sep. 1, 2009.
Final Rejection for U.S. Appl. No. 11/616,243 mailed Sep. 15, 2009.
Final Rejection for U.S. Appl. No. 11/537,609 mailed Nov. 17, 2009.
Non-Final Rejection for U.S. Appl. No. 12/123,443 mailed Jan. 27, 2010.
Non-Final Rejection for U.S. Appl. No. 10/991,970 mailed Jan. 12, 2010.
Non-Final Rejection for U.S. Appl. No. 10/991,970 mailed Dec. 31, 2009.

* cited by examiner

IDENTIFYING NODES IN A RING NETWORK

CROSS-REFERENCE TO RELATED APPLICATIONS

This application is a Divisional of application Ser. No. 09/894,471 filed on Jun. 28, 2001, which is hereby incorporated by reference for all purposes.

FIELD

The present invention relates generally to computer networks and more particularly to the identification of nodes on a ring network.

BACKGROUND

The interest in the computer networks is growing every day, as more and more users want the capability to access information at remote locations. A computer network is composed of nodes and the communication links between the nodes. In order for a first node to access information at a remote node, the first node must have a way to know that the remote node exists. Thus, the nodes in the network need configuration information that described the topology of the other nodes in the network.

In prior networks, a predetermined master node would send a query to every node address asking whether a node exists at that address. When the master node received acknowledgment back, it would then know at which addresses other nodes existed. Whenever nodes were added to or removed from the network, the master node needed to repeat these queries to determine the new node topology, which was a time-consuming task. Thus, these prior networks suffered from heavy network traffic and performance problems. Further, if the master node was removed or disabled, the network had no way of determining the network topology.

Hence, there is a need for a solution that overcomes the problems of the prior art and provides an improved technique for determining network topology.

SUMMARY

Methods are described for arbitrating among multiple nodes participating in a ring network to determine which will become the master node. According to one embodiment, if a first node of the multiple nodes has not received an arbitration token during a predetermined period of time, then the first node originates and transmits a new arbitration token onto the ring network. If the first node receives the arbitration token during the predetermined period of time, then when a node identifier associated with the arbitration token is at a lower priority than a node identifier associated with the first node, the first node modifies the arbitration token by replacing the node identifier associated with the arbitration token with the node identifier associated with the first node and retransmits the modified arbitration token onto the ring network.

According to another embodiment, a first node of the multiple nodes on the ring network initiates circulation of a new arbitration token among the multiple nodes on the ring network by (i) generating the new arbitration token responsive to determining an arbitration token timeout period has elapsed without the first node detecting an arbitration token on the ring network and (ii) transmitting the new arbitration token to a neighboring node of the plurality of nodes on the ring network. Upon receipt of the new arbitration token by a node, the node determines its relative priority to that of the first node by comparing a local ID of the node to an ID field of the arbitration token, which is initialized by the first node to the ID of the first node prior to transmission of the new arbitration token onto the ring network. If the node is determined to be higher priority than the first node, then the node overwrites the ID field with the local ID and retransmits the new arbitration token onto the ring network. If the node is determined to be lower priority than the first node, then the node retransmits the new arbitration token onto the ring network without overwriting the ID field. If the node is determined to be of equal priority and the node is the first node, then the first node assumes the master node role, wherein once the new arbitration token is passed all the way around the ring network and back to the first node unmodified by any higher priority nodes of the plurality of nodes, the first node becomes the master node.

Other features of embodiments of the present invention will be apparent from the accompanying drawings and from the detailed description that follows.

DETAILED DESCRIPTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the scope of the present invention. The following detailed description is, therefore, not to be taken in a limiting sense.

In the figures, the same reference number is used throughout to refer to an identical component which appears in multiple figures. Signals and connections may be referred to by the same reference number or label, and the actual meaning will be clear from its use in the context of the description.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form to electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing," "computing," "calculating," "determining," "displaying," or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission, or display devices.

Figure 1:
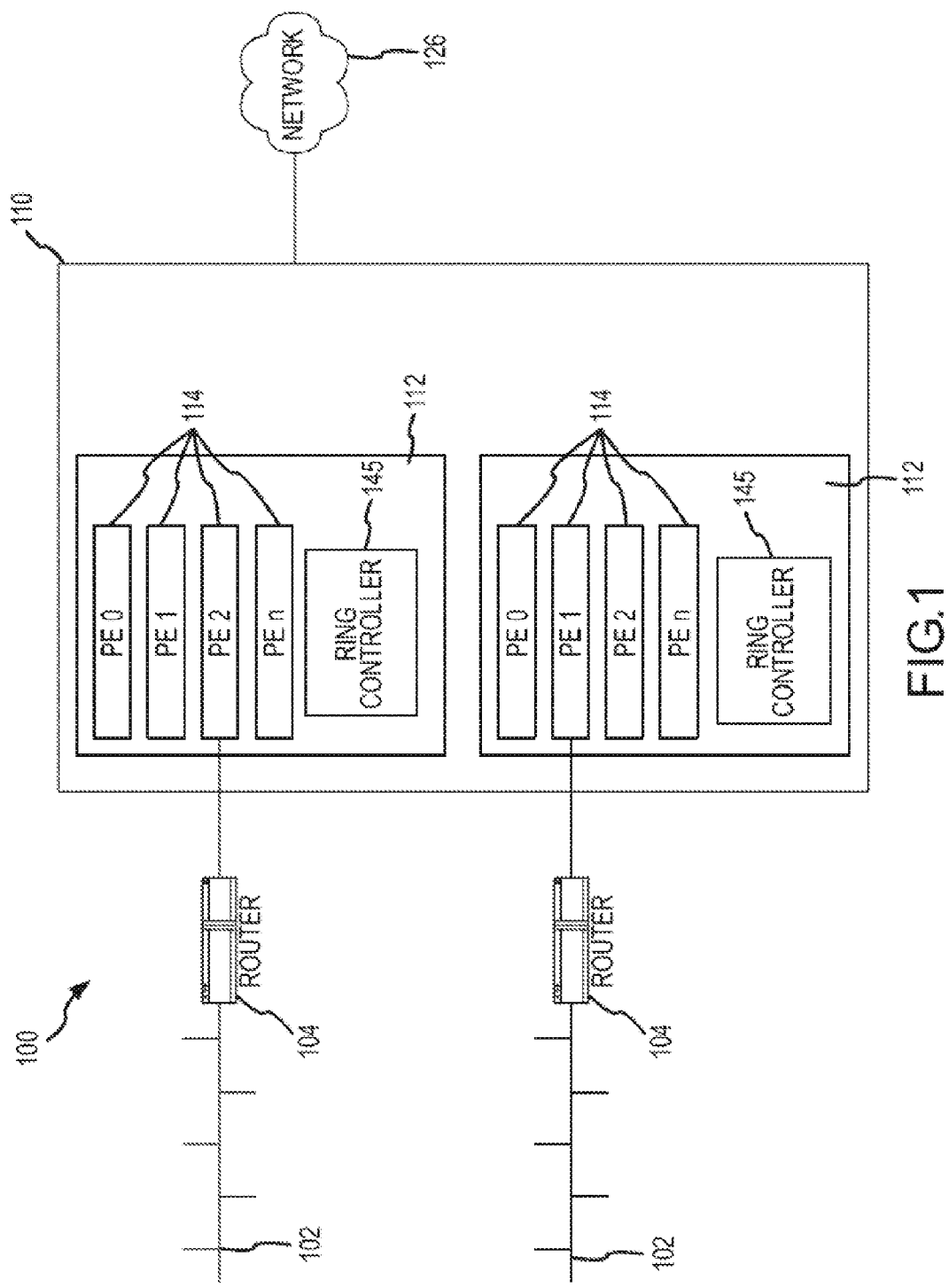
FIG. 1 is a block diagram of the hardware and operating environment in which different embodiments of the invention can be practiced.

FIG. 1 is a diagram of the hardware and operating environment in conjunction with which embodiments of the invention may be practiced. The description of FIG. 1 is intended to provide a brief, general description of suitable computer routing hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

As shown in FIG. 1, system 100 includes service processing switch 110, access routers 104, and network 116. In one embodiment, service processing switch 110 provides switching, routing, and computing resources that can be allocated by a service provider to customers. In one embodiment, service processing switch 110 is the IPSX 9000 service processing switch from CoSine Communications, Inc. But, the invention is not limited to any particular switch, router, or service processing hardware.

Service processing switch 110 includes one or more blades 112. In some embodiments, blades 112 have a type associated with them. Examples of blade types include processing functions such as network blades, control blades, trunk blades, and processor blades. Network blades provide interfaces to different types of networks. Control blades provide system management and accounting functions to service processing system 110. Trunk blades provide access to high speed trunk networks. Processor blades provide general purpose computer processors that in some embodiments provide firewall, intrusion detection, or directory services. Blades are communicably coupled to one another via a packet ring or rings, as further described below with reference to FIG. 2. Referring again to FIG. 1, each blade includes ring controller 145, which contains logic for interfacing to a ring network that connects the blades, as further described below with reference to FIGS. 3-5.

Referring again to FIG. 1, each of blades 112 includes one or more processing elements 114. Processing elements 114 includes CPUs and memory that provide computing resources for the blade, as further described below with reference to FIG. 2. Referring again to FIG. 1, the invention is not limited to any particular number of processing elements on a blade, nor is the invention limited to any particular number of blades in a service processing switch 110. Software tasks, in some embodiments, are split up such that one processor operates on one part of the data and another processor operates on another part of the data. In other embodiments, the various processing portions of a task all run on a single processor, multiprocessing with other tasks that share that processor. Thus, the hardware provides scalability, where low-end systems include few processors that do all the work, and high-end systems include one hundred or more processors and the work is distributed among the processors for greater speed and throughput.

Service processing system 110 is typically communicably coupled to a network 116, of example the Internet. Network 116 can also be a Wide Area Network (WAN), a Local Area Network (LAN), or a private network. Service processing system 110 is also typically communicatively coupled to a plurality of customer networks 102 via customer access routers 104.

Figure 2:
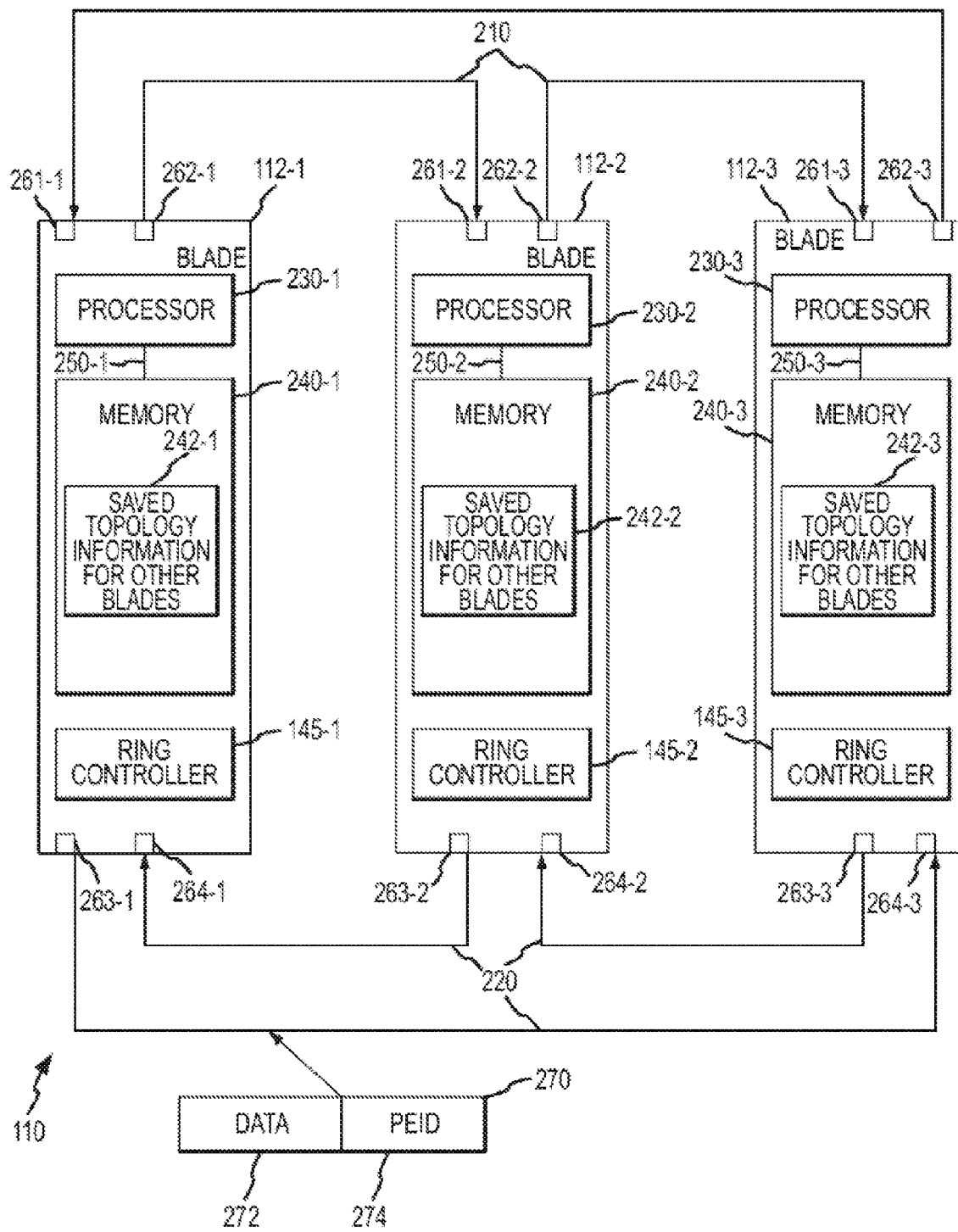
FIG. 2 is a block diagram of a multi-blade system connected via a ring network, according to an embodiment of the invention.

FIG. 2 is a block diagram of a multi-blade system connected via a ring network within service processing system 110, according to an embodiment of the invention. In some embodiments, each of two network rings 210 and 220 communicatively connect blades 112-1, 112-2, and 112-3 together. Although three blades are shown, in another embodiment any number can be present. Blade 112-1 contains processor 230-1 and memory 240-1 connected via system bus 250-1. Blade 112-1 also contains ring controller 145-1. Blade 112-2 contains processor 230-2 and memory 240-2 connected via system bus 250-2. Blade 112-1 also contains ring controller 145-2. Blade 112-3 contains processor 230-3 and memory 240-3 connected via system bus 250-3. Blade 112-1 also contains ring controller 145-3. Each blade optionally includes other hardware; for example although only one processor and memory are shown in the blades, each can contain multiple processors and multiple memories, as previously described above with reference to FIG. 1.

Referring again to FIG. 2, each memory 240-1, 240-2, and 240-3 contains respective topology information for the other blades 242-1, 242-2, and 242-3, which contains a discovery marker's connection state, the control blade master state, and blade characteristics. The topology information is further described below with reference to FIG. 5.

Referring again to FIG. 2, network ring 210 is a primary ring, which connects the blades in one direction, and network ring 220 is a protect ring, which connects the blades in the opposite direction. Primary ring 210 is used for normal packet transmission and reception, unless a break is detected in the ring as a result of blade failure or removal. When connection faults are detected, the affected blades begin using protect ring 220 to bypass the bad or missing connection. The packet ring hardware manages and discovers topology changes, and provides software with a current topology map, as further described below with reference to FIGS. 4 and 5.

Blade 112-1 contains primary-ring receive port 261-1, primary-ring transmit port 262-1, protect-ring transmit port 263-1, and protect-ring receive port 264-1. Blade 112-2 contains primary-ring receive port 261-2, primary-ring transmit port 262-2, protect-ring transmit port 263-2, and protect-ring receive port 264-2. Blade 112-3 contains primary-ring receive port 261-3, primary-ring transmit port 262-3, protect-ring transmit port 263-3, and protect-ring receive port 264-3.

Rings 210 and 220 are packet-passing rings. Each packet 270 placed in the rings includes a data portion 272 and a processor element identifier (PEID 274), which identifiers the destination processor for the packet. If the PEID matches a processor on its particular blade, the blade 112 passes the packet to the proper processor; if not, the packet is forwarded to the next blade. Although packet 270 is shown as traveling in ring 220, it can also travel in ring 210.

Although the embodiment of FIG. 2 has been described in the context of a network of blades within a switch, the invention applies equally to any nodes in a network, whether the nodes are contained within the same housing, located within the same room, or situated vast geographical distances apart.

In the previous section, a system level overview of the operation of exemplary embodiments of the invention were described. In this section, the particular methods of the invention performed by an operating environment executing an exemplary embodiment are described. In one embodiment the methods to be performed constitute computer programs made up of computer-executable instructions. But, in other embodiments the methods can be implemented using hardware in lieu of a processor-based system. Describing the methods enables one skilled in the art to develop such programs including such instructions to carry out the methods on suitable computers (the processor of the computer executing the instructions from computer-readable media). Describing the methods also enables one skilled in the art to develop hardware to carry out the described methods.

Figure 3:
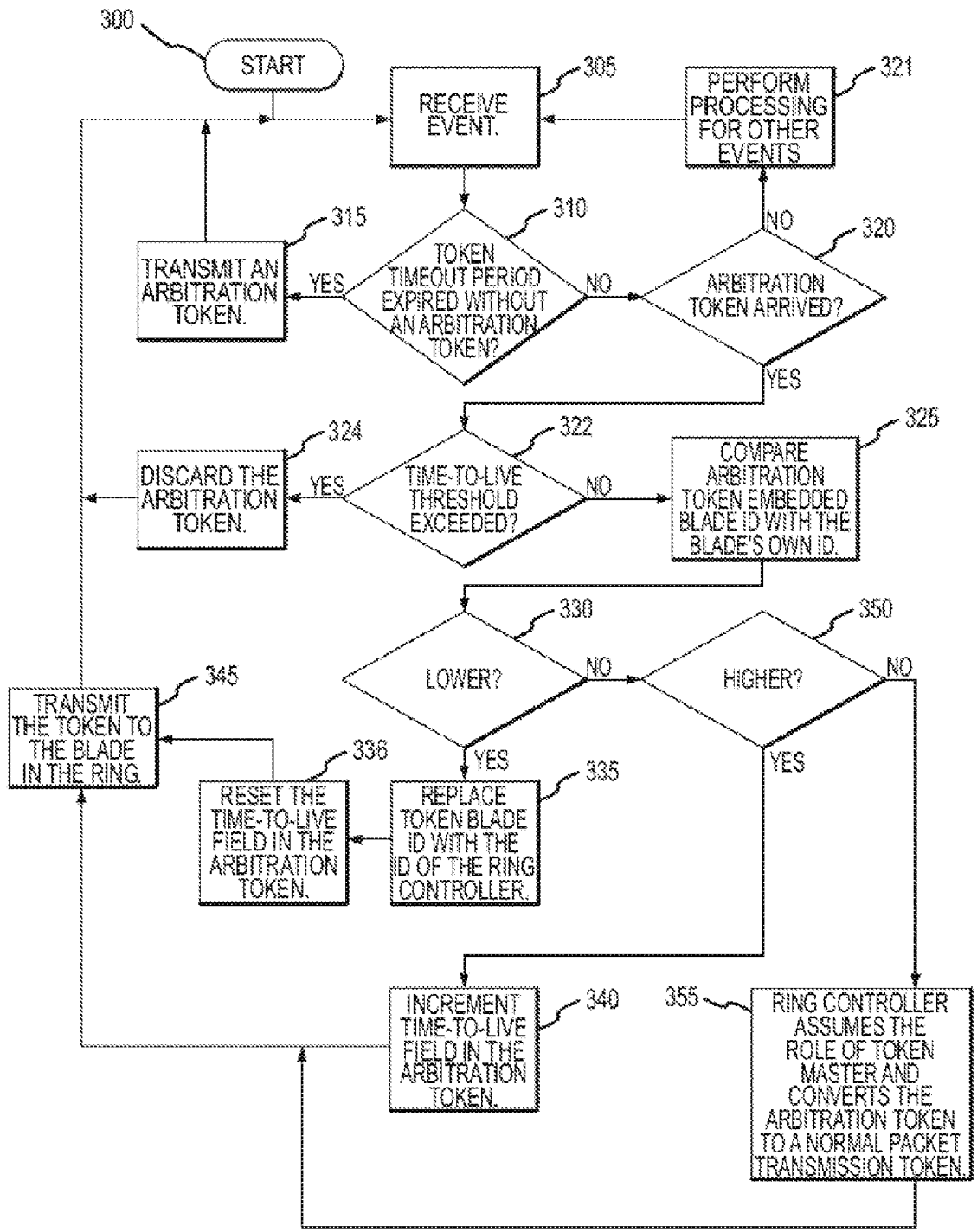
FIG. 3 is a flowchart of master blade arbitration logic, according to an embodiment of the invention.

FIG. 3 is a flowchart of token master blade arbitration logic, according to an embodiment of the invention. The functions described in FIG. 3 are carried out by any of blades 112. Packet rings 210 and 220 use a token arbitration scheme, allowing one blade (the blade that has most recently received a token marker) to transmit locally generated packets. A token marker is a one-cycle message with a unique encoding. At power-up, or after a connection state transition, a token may not be present in the packet ring. When this happens, a single blade takes responsibility for generating a token, so that packet transmission can proceed. This single blade is referred to as the token master blade, and the token master arbitration logic is described as follows.

Control begins at block 300. Control then continues to block 305 where an event is received at the blade. Control then continues to block 310 where blade 112 determines whether the event previously received at block 305 was a token timeout period expiration event. The token timeout period can expire, for example, when a blade insertion/removal event causes token loss or when no token has yet been generated following power-up.

If the determination at block 310 is true, then control continues to block 315 where blade 112 transmits an arbitration token on the ring network. In this way, a blade generates an arbitration token whenever a token timeout period has passed without detecting the arrival of a token. In one embodiment, the token timeout period is calculated by multiplying (max system blade count*(max packet delay+ring I/O latency) *clock period). In this token-based ring network, an arbitration token is passed around the nodes of the ring, and only the node that currently has the token has permission to send a packet on the ring. Control then returns to block 305, as previously described above.

If the determination at block 310 is false, then control continues to block 320 where blade 112 determines whether an arbitration token arrived event occurred at block 305. If the determination at block 320 is false, then control continues to block 321 where processing for other events occurs. Control then returns to block 305, as previously described above.

If the determination at block 320 is true, then control continues to block 322 where blade 112 determines whether the time-to-live field in the received arbitration token exceeds the time-to-live threshold. If the determination at block 322 is true, then control continues to block 324 where blade 112 discards the arbitration token. Control then returns to block 305 as previously described above.

If the determination at block 322 is false, then control continues to block 325 where blade 112 compares the arbitration token blade ID with its own local blade ID. From block 325, control continues to block 330 where blade 112 determines whether the arbitration token blade ID is a lower priority than the ring controller blade ID. If the determination at block 330 is true, then control continues to block 335 where blade 112 replaces the token blade ID with the ID of the ring controller. Control then continues to block 336 where blade 112 resets the time-to-live field in the arbitration token. Control then continues to block 345 where blade 112 transmits the token to the next blade in the ring. Control then returns to block 305, as previously described above.

If the determination at block 330 is false, the control continues to block 350 where blade 112 determines whether the arbitration token blade ID is at a higher priority than the ring controller blade ID. If the determination at block 350 is true, then control continues to block 340 where blade 112 increments the time-to-live field in the arbitration token. Control then controls to block 345, as previously described above.

If the determination at block 350 is false, then the arbitration token blade ID has an equal priority to the ring controller blade ID, so control continues to block 355 where blade 112 makes itself the token master blade and converts the received arbitration token to a normal packet transmission token. Thus, once the arbitration token previously generated at block 315 is passed all the way around the ring network and back to this blade unmodified by any higher priority blade, this blade becomes the master blade. Control then continues to block 345, as previously described above.

Figure 4:
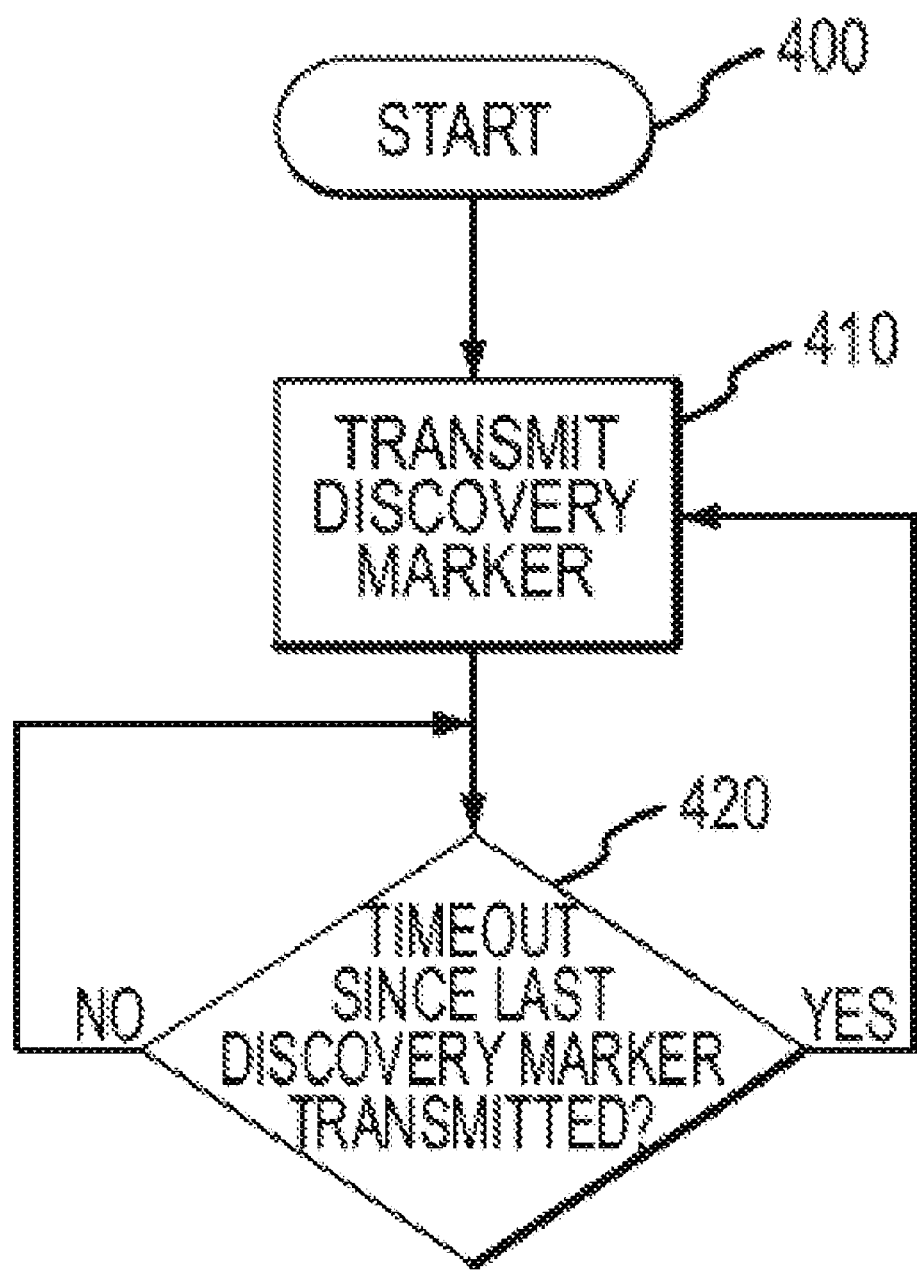
FIG. 4 is a flowchart of the master blade functions, according to an embodiment of the invention.

FIG. 4 is a flowchart of the token master blade functions, according to an embodiment of the invention. A blade became a token master blade as previously described above with reference to blocks 315 and 355. Control begins at block 400. Control then continues to block 410 where the master blade transmits a discovery marker. A discovery marker is further described below with reference to FIG. 6. Control then continues to block 420 where the master blade determines whether a period of time has expired since the last discovery marker was transmitted. If the determination at block 420 is false, then control returns to block 420. If the determination at block 420 is true, then control returns to block 410. In this way, the master blade periodically transmits a discovery marker.

Figure 5:
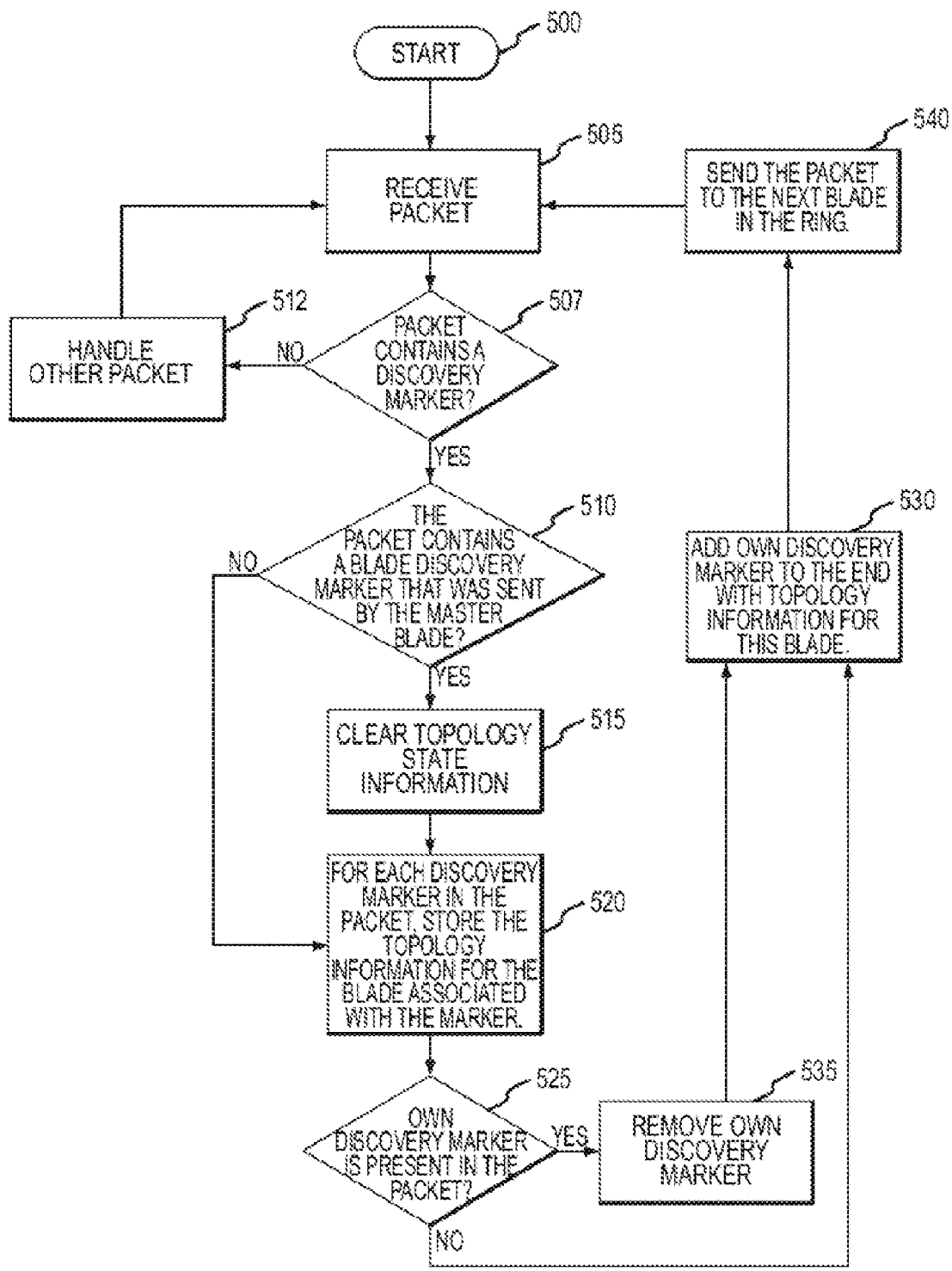
FIG. 5 is a flowchart of blade discovery logic, according to an embodiment of the invention.

FIG. 5 is a flowchart of blade discovery logic, according to an embodiment of the invention. Control begins at block 500. Control then continues to block 500 where blade 112 receives a packet from the packet ring. Control then continues to block 507 where blade 112 determines whether the packet contains any discovery markers. If the determination at block 507 is false, then control continues to block 512 where other types of packets are handled. Control then returns to block 505, as previously described above.

If the determination at block 507 is true, then control continues to block 510 where blade 112 determines whether any of the discovery markers in the packet were sent by the master blade. A blade discovery marker was sent at block 410, as previously described above with reference to FIG. 4.

Referring again to FIG. 5, if the determination at block 510 is true, then control continues to block 515 where blade 112 clears its topology information (242-1, 242-2, or 242-3, depending on the blade) for all known blades. Control then continues to block 520 where blade 112, for each marker in the packet, stores the topology information for the blade associated with the marker.

If the determination at block 510 is false, then control continues directly to block 520, as previously described above.

From block 520, control then continues to block 525 where blade 112 determines whether its own discovery marker is present in the packet. If the determination is false, then control continues to block 530 where blade 112 adds its own discovery marker to the end of the packet, including its own topology information. Control then continues to block 540 where blade 112 sends the packet to the next blade in the ring. Control then returns to block 505, as previously described above.

If the determination at block 525 is true, the control continues to block 535 where blade 112 removes its own discovery marker from the packet. Control then continues to block 530, as previously described above.

In this way all blades in the packet ring see a discovery marker and associated topology information for every other active blade.

Figure 6:
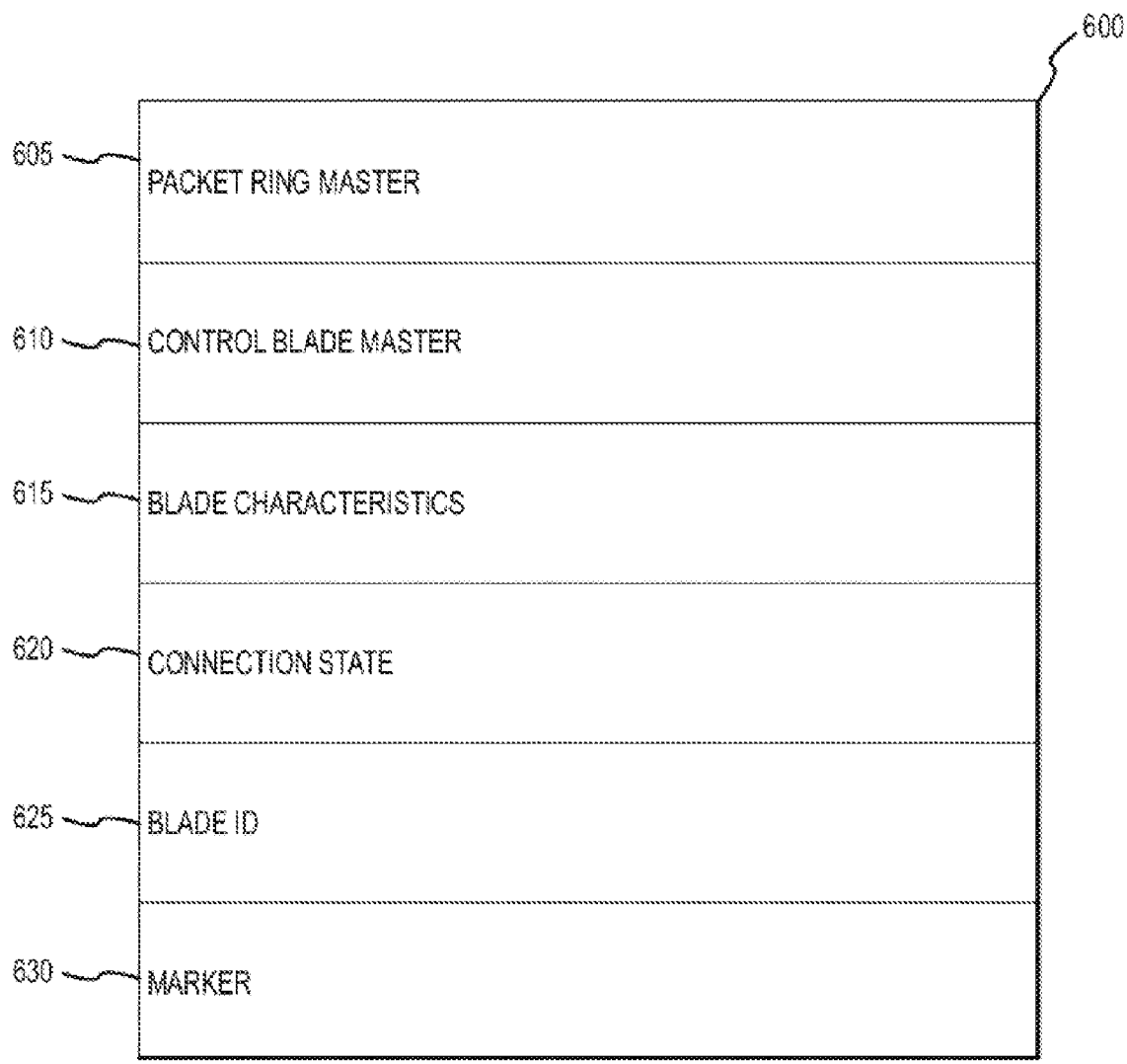
FIG. 6 describes a discovery marker data structure, according to an embodiment of the invention.

FIG. 6 describes discovery marker data structure 600, according to an embodiment of the invention. Discovery marker data structure 600 includes packet ring master field 605, control blade master field 610, blade characteristics field 615, connection state field 620, blade ID field 625, and marker field 630.

Packet ring master field 605 contains an indication of whether the originating blade is the current packet ring token master blade. Control blade master field 610 contains an indication of whether the blade is the control blade master. Blade characteristics field 615 specifies per-blade characteristics, which is information that can be used to distinguish the features of the blade.

Connection state field 620 contains an indication of the blade's current connection state for its primary and protect ring neighbors. Connection state field 620 allows blades to only switch-in a neighboring blade when both blades agree that the connection is good. It also allows a blade that detect a connection fault to notify their neighbor before switching out. This prevents situations where one side of a connection switches while the other side does not, causing a long-term break in the packet ring.

Blade ID field 625 contains a slot identifier for the associated blade. Marker field 630 identifies this marker as a blade discovery marker.

What is claimed is:

1. A method of arbitrating among a plurality of nodes participating in a ring network, the method comprising:
   when a first node of the plurality of nodes has not received an arbitration token during a predetermined period of time, then, the first node originating and transmitting a new arbitration token onto the ring network, wherein arbitration tokens are used to identify a token master of the plurality of nodes that is responsible for generating a packet transmission token onto the ring network and wherein the packet transmission token authorizes a transmitting node of the plurality of nodes that has most recently received the packet transmission token to transmit locally generated packets onto the ring network;
   when the first node receives the arbitration token during the predetermined period of time, then when a node identifier associated with the arbitration token is at a lower priority than a node identifier associated with the first node, the first node modifying the arbitration token by replacing the node identifier associated with the arbitration token with the node identifier associated with the first node and retransmitting the modified arbitration token onto the ring network; and
   wherein the predetermined period of time is calculated by $N*(D+L)*C$, where N is a number of the plurality of nodes, D is a maximum packet delay, L is a ring latency input/output measure and C is a clock period.

2. The method of claim 1, further comprising the first node retransmitting the arbitration token onto the ring network without replacing the node identifier associated with the arbitration token when the node identifier associated with the arbitration token is at a higher priority than the node identifier associated with the first node.

3. The method of claim 1, further comprising the first node converting the arbitration token to the packet transmission token and transmitting the packet transmission token on the ring network when the node identifier associated with the arbitration token is at an equal priority to the node identifier associated with the first node.

4. The method of claim 2, further comprising the first node incrementing a time-to-live field in the arbitration token when the node identifier associated with the arbitration token is at the higher priority than the node identifier associated with the first node.

5. The method of claim 4, further comprising the first node discarding the arbitration token when the time-to-live field for the arbitration token is exceeded.

6. A node in a ring network, comprising:
   a hardware ring controller to:
      transmit an arbitration token on the ring network when a predetermined period of time has expired without receipt of the arbitration token, wherein arbitration tokens are used to identify a token master of a plurality of nodes in the ring network that is responsible for generating a packet transmission token onto the ring network and wherein the packet transmission token authorizes a transmitting node of the plurality of nodes that has most recently received the packet transmission token to transmit locally generated packets onto the ring network,
      receive the arbitration token,
      when a node identifier associated with the arbitration token is at a lower priority than a node identifier associated with the first node, replace the node identifier associated with the arbitration token with the node identifier associated with the first node and transmit the arbitration token on the ring network, and
      wherein the predetermined period of time is equal to $N*(D+L)*C$, where N is a number of the plurality of nodes, D is a maximum packet delay, L is a ring latency input/output measure and C is a clock period.

7. The node of claim 6, wherein the hardware ring controller is further configured to transmit the arbitration token on the ring network when the node identifier associated with the arbitration token is at a higher priority than the node identifier associated with the first node.

8. The node of claim 6, wherein the hardware ring controller is further configured to convert the arbitration token to the packet transmission token and transmit the packet transmission token on the ring network when the node identifier associated with the arbitration token is at an equal priority to the node identifier associated with the first node.

9. The node of claim 7, wherein the hardware ring controller is further configured to increment a time-to-live field in the arbitration token when the node identifier associated with the arbitration token is at the higher priority than the node identifier associated with the first node.

10. The node of claim 9, wherein the hardware ring controller is further configured to discard the arbitration token when the time-to-live field for the received arbitration token is exceeded.

11. A method of determining a token master on a ring network, the method comprising:
- defining at least two different types of tokens recognized by a plurality of nodes on the ring network, including an arbitration token and a packet transmission token, wherein the arbitration token is used to identify the token master of the plurality of nodes, which is responsible for generating the packet transmission token onto the ring network, and wherein the packet transmission token authorizes a transmitting node of the plurality of nodes that has most recently received the packet transmission token to transmit locally generated packets onto the ring network;
- a first node of the plurality of nodes initiating circulation of a new arbitration token among the plurality of nodes by (i) generating the new arbitration token responsive to determining an arbitration token timeout period has elapsed without the first node detecting the arbitration token on the ring network and (ii) transmitting the new arbitration token to a neighboring node of the plurality of nodes;
- upon receipt of the new arbitration token by a node of the plurality of nodes, the node determining its relative priority to that of the first node by comparing a local ID of the node to an ID field of the arbitration token, which is initialized by the first node to an ID of the first node prior to transmission of the new arbitration token onto the ring network;
- if the node is determined to be higher priority than the first node, then the node overwriting the ID field with the local ID and retransmitting the new arbitration token onto the ring network;
- if the node is determined to be lower priority than the first node, then the node retransmitting the new arbitration token onto the ring network without overwriting the ID field;
- if the node is determined to be of equal priority and the node is the first node, then the first node assuming a token master role and transmitting the packet transmission token onto the ring network, whereby once the new arbitration token is passed all the way around the ring network and back to the first node unmodified by any higher priority nodes of the plurality of nodes, the first node becomes the token master; and
- wherein the arbitration token timeout period is equal to $N*(D+L)*C$, where N is a number of the plurality of nodes, D is a maximum packet delay, L is a ring latency input/output measure and C is a clock period.

* * * * *